(12) United States Patent
Chen

(10) Patent No.: US 7,553,084 B2
(45) Date of Patent: Jun. 30, 2009

(54) LINEAR ROLLER GUIDE UNIT FOR COMPRESSIVE LOAD

(75) Inventor: Tsung-Jen Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 358 days.

(21) Appl. No.: 11/469,517

(22) Filed: Sep. 1, 2006

(65) Prior Publication Data

US 2008/0056626 A1  Mar. 6, 2008

(51) Int. Cl.
*F16C 29/06* (2006.01)
(52) U.S. Cl. ..................................................... 384/45
(58) Field of Classification Search ............. 384/43–45, 384/48
See application file for complete search history.

(56) References Cited

U.S. PATENT DOCUMENTS

| | | | | | |
|---|---|---|---|---|---|
| 4,692,037 | A | * | 9/1987 | Kasai | 384/44 |
| 4,715,729 | A | * | 12/1987 | Tanaka | 384/44 |
| 5,273,365 | A | * | 12/1993 | Kondoh | 384/44 |
| 5,308,164 | A | * | 5/1994 | Tanaka | 384/13 |
| 5,672,011 | A | * | 9/1997 | Eder et al. | 384/45 |
| 5,800,064 | A | * | 9/1998 | Ohya | 384/44 |
| 6,109,789 | A | * | 8/2000 | Chen | 384/48 |
| 6,231,238 | B1 | * | 5/2001 | Teramachi | 384/45 |

* cited by examiner

*Primary Examiner*—Thomas R Hannon
(74) *Attorney, Agent, or Firm*—Banger Shia

(57) ABSTRACT

A linear roller guide unit comprises an elongated rail and a carrier straddling the rail. A plurality of rollers is installed between the carrier and the rail so that the carrier can slide along the elongated rail. By installing six rows of rollers within the existing standard cross section, the invention can achieve long life, high load capacity and high rigidity.

4 Claims, 11 Drawing Sheets

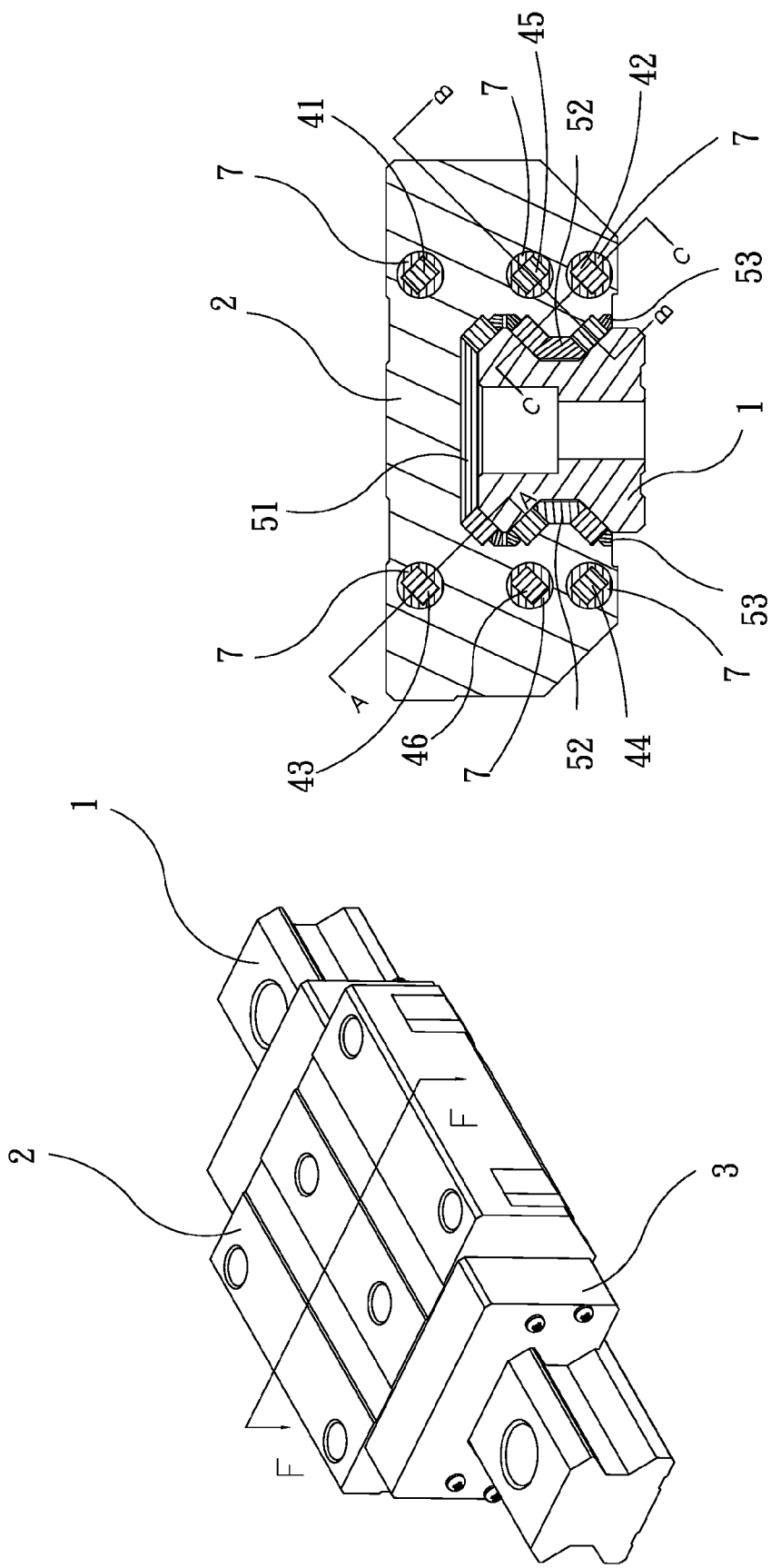

SECTION A-A

SECTION B-B

SECTION C-C

LINEAR ROLLER GUIDE UNIT FOR COMPRESSIVE LOAD

BACKGROUND OF THE INVENTION

1. Field of the Invention

The present invention relates to a design regarding the linear roller guide unit for compressive load, which is applied in the linear transmission device and is capable of substantially improving the performance of the linear roller guide unit in many respects, including the service life, the structural strength, the rigidity, the load capacity and the impact-resistant.

2. Description of the Prior Art

The existing linear guideway essentially comprises a rail and a slide block. The rail is an elongated structure defined with rolling grooves for allowing the rollers to circulate therein. The slide block is reverse U-shaped and also defined with grooves for cooperating with the rolling grooves. And two end caps are installed at both ends of the slide block to enable the rollers to circulate. Each of the end caps is defined with a return path for enabling the rollers to circulate from the slide block to the rail.

The existing technologies for the roller type linear guideway are generally classified into the following categories:

Firstly, four-row type linear roller guide unit is one of the conventional technologies, for example, which is disclosed in U.S. Pat. Nos. 4,692,037, 4,715,729, 6,109,789 and JP Pt 60139912. FIG. 1 shows a conventional four-row linear roller guide unit, wherein the four rows of rollers are arranged at both wing portions of the slide block 22 in a crossed manner.

After analyzing the structural strength and the geometric relation, with reference to FIG. 2, it is found that the four-row type linear roller guide unit has the following disadvantages:

1. When the rail is subjected to a compressive load F, the compressive load will be applied to the lower two rows of rollers 34,35 only, and this is likely to cause trumpet deformation of the slide block 32, and a poor precision of the linear guide unit.

2. when only two rows of rollers 35 carry the compressive load, the rollers will produce a comparatively large contact stress, and as a result, the material of rollers are more susceptible to fatigue, substantially reducing the service life of the linear guide unit.

Secondly, U.S. Pat. No. 5,672,011 discloses another six-row type linear ball guide unit, as shown in FIGS. 3 and 4, wherein the six rows of balls 30 are horizontally arranged at both wing portions of the slide block 10. This design requires three circulating holes 4 to be formed in each wing portions of the slide block 101 to allow for the circulation of the balls 30.

After analyzing the structural strength and the geometric relation, with reference to FIG. 4, it is found that the six-row type linear roller guide unit has the following disadvantages:

1. The thickness of the slide block 10 will be substantially reduced under the condition that the cross section is fixed, result in a poor structural strength of the slide block, and this is likely to cause trumpet deformation of the slide block 22 and a poor precision of the linear guide unit.

2. As compared to the line-to-line contact relation between the roller and the surface of the rolling path, the balls 30 are in a point-to-point contact with the rolling path 50. When carrying the compressive load, the balls 30 will produce a comparatively large contact stress, thus accelerating the material fatigue of rollers, substantially reducing the service life of the linear guide unit.

The present invention has arisen to mitigate and/or obviate the afore-described disadvantages.

SUMMARY OF THE INVENTION

The primary objective of the present invention is to provide a design regarding the linear roller guide unit for compressive load, which is applied in the linear transmission device and is capable of substantially improving the performance of the linear roller guide unit in many respects, including the service life, the structural strength, the rigidity, the load capacity and the impact-resistant.

To achieve the abovementioned objective, the linear roller guide unit for compressive load in accordance with the present invention comprises:

a rail, a slide block, six rows of rollers, a plurality of retaining members for holding the rollers, six turning members, six circulation pipes, two end caps, and a plurality of fasteners.

The present invention is characterized in that:

the rail is an elongated structure approximately I-shaped in cross section, a flat rolling surface for rollers is formed at each of a top right, a bottom right, a top left, a bottom left of a head portion of the rail, and at a top right and a top left of a bottom of the rail, the slide block has at least six through holes allowing for circulation of the rollers, and at least six flat rolling surfaces on which the rollers roll, the six flat surfaces of the slide block are located correspondingly to the flat rolling surfaces of the rail. The six rows of rollers are arranged in pairs between the flat rolling surfaces, the retaining members serve to hold the rollers and to prevent the rollers from falling off when the slide block is disengaged from the rail. The six turning members includes inner members and outer members, each of the inner and outer turning members is defined with an arc-shaped surface, an arc-shaped surface is formed on an inner side of each of the outer turning members and is located opposite the respective inner turning members, the turning members are set at both ends of the slide block and serve to turn the moving direction of the rollers. Each of the circulation pipes is a hollow structure inserted in the through holes of the slide block for allowing the rollers to circulate. The end caps are installed at both ends of the slide block, and each of the end caps is defined with six arc-shaped surfaces for mating with the turning members. The turning members cooperate with the circulation pipes and the two end caps to form a circulation path for allowing the rollers to circulate endless.

A contact angle of upper rows of the rollers with respect to the flat rolling surface is a, a contact angle of mid rows of rollers with respect to the flat rolling surface is $\beta$, and a contact angle of lower rows of the rollers with respect to the flat rolling surface is $\gamma$. The mid rows of rollers cross the lower rows of the rollers, for ensuring that the rollers can roll smoothly, the circulating direction $Y_i$ of the respective rows of rollers is approximately vertical to the long axis direction $X_i$ of the rollers, and the $\beta$ and $\gamma$ is approximately 45 degrees. When the contact angle a of the upper rows of rollers is 90 degrees, the linear guide unit will have an optimum load capacity and impact-resistant performance when it is subjected to a compressive load, when the contact angle a is 45 degrees, the upper rows and lower rows of rollers will share the load equally, thus prolonging the service life of the linear roller guide unit, therefore, $45° \leq a \leq 90$ degrees.

The present invention will be more clear from the following description when viewed together with the accompanying drawings, which show, for purpose of illustrations only, the preferred embodiment in accordance with the present invention.

BRIEF DESCRIPTION OF THE DRAWINGS

FIG. 8 is a perspective assembly view of showing the liner guide unit in accordance with the present invention;

FIG. 9 is a cross sectional view taken along the line F-F of FIG. 9;

DETAILED DESCRIPTION OF THE PREFERRED EMBODIMENTS

The foregoing, and additional objects, features and advantages of the present invention will become apparent from the following detailed description of preferred embodiments thereof, taken in conjunction with the accompanying drawings.

Figure 1:
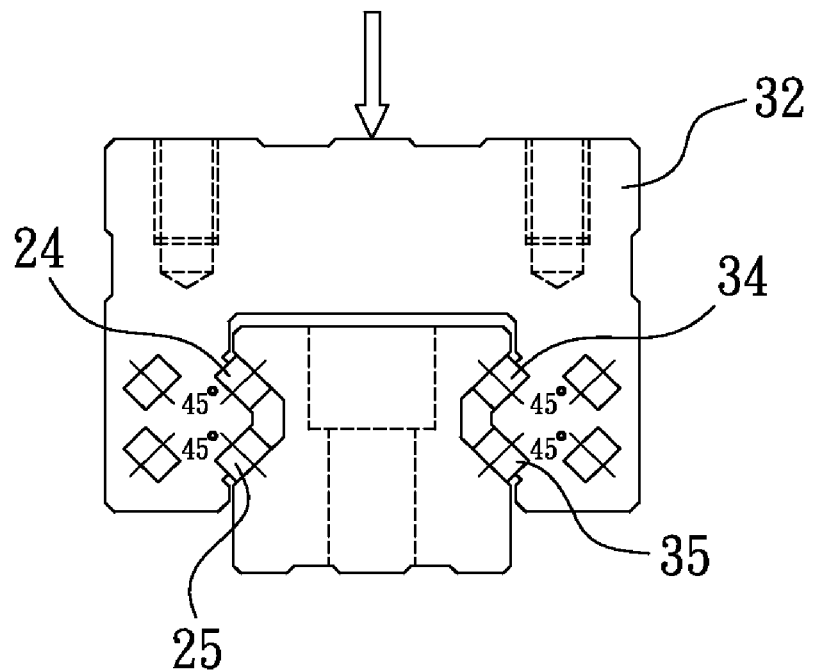
FIG. 1 shows a conventional four-row linear roller guide unit.
Figure 2:
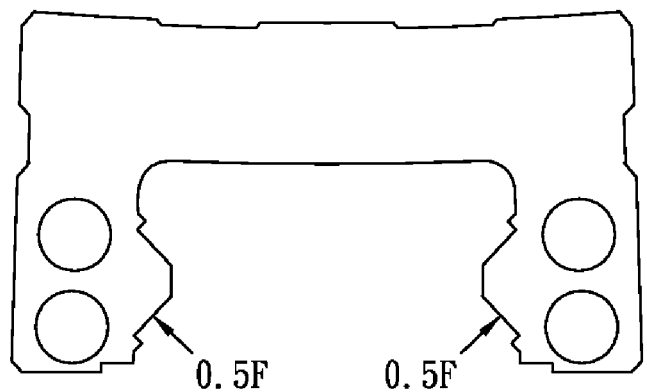
FIG. 2 is an illustrative view of showing a slide block of a conventional four-row linear roller guide unit.
Figure 3:
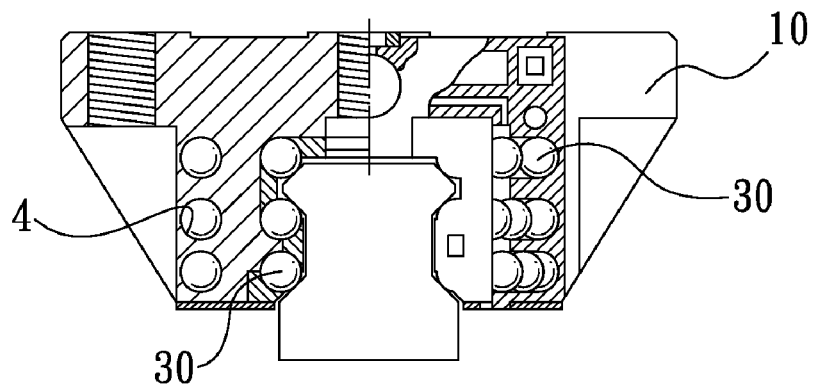
FIG. 3 is a cross section assembly view of a conventional six-row linear roller guide unit.
Figure 4:
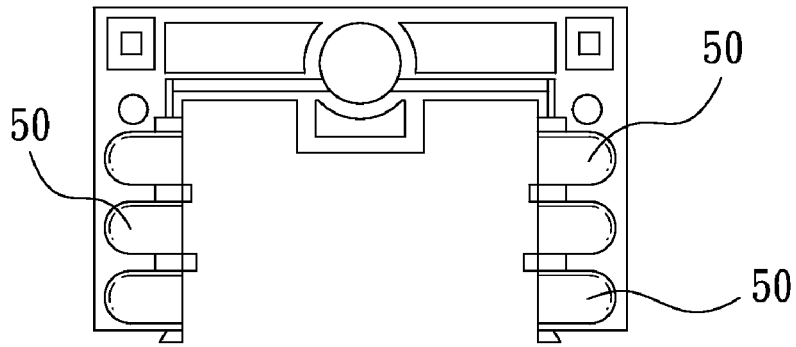
FIG. 4 shows a conventional end cap.
Figure 5:
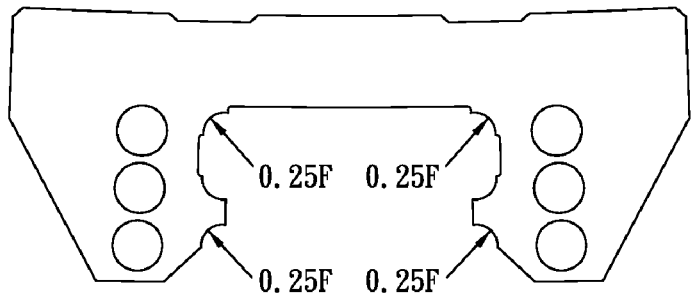
FIG. 5 is an illustrative view of showing a slide block of the conventional six-row linear roller guide unit.
Figure 6:
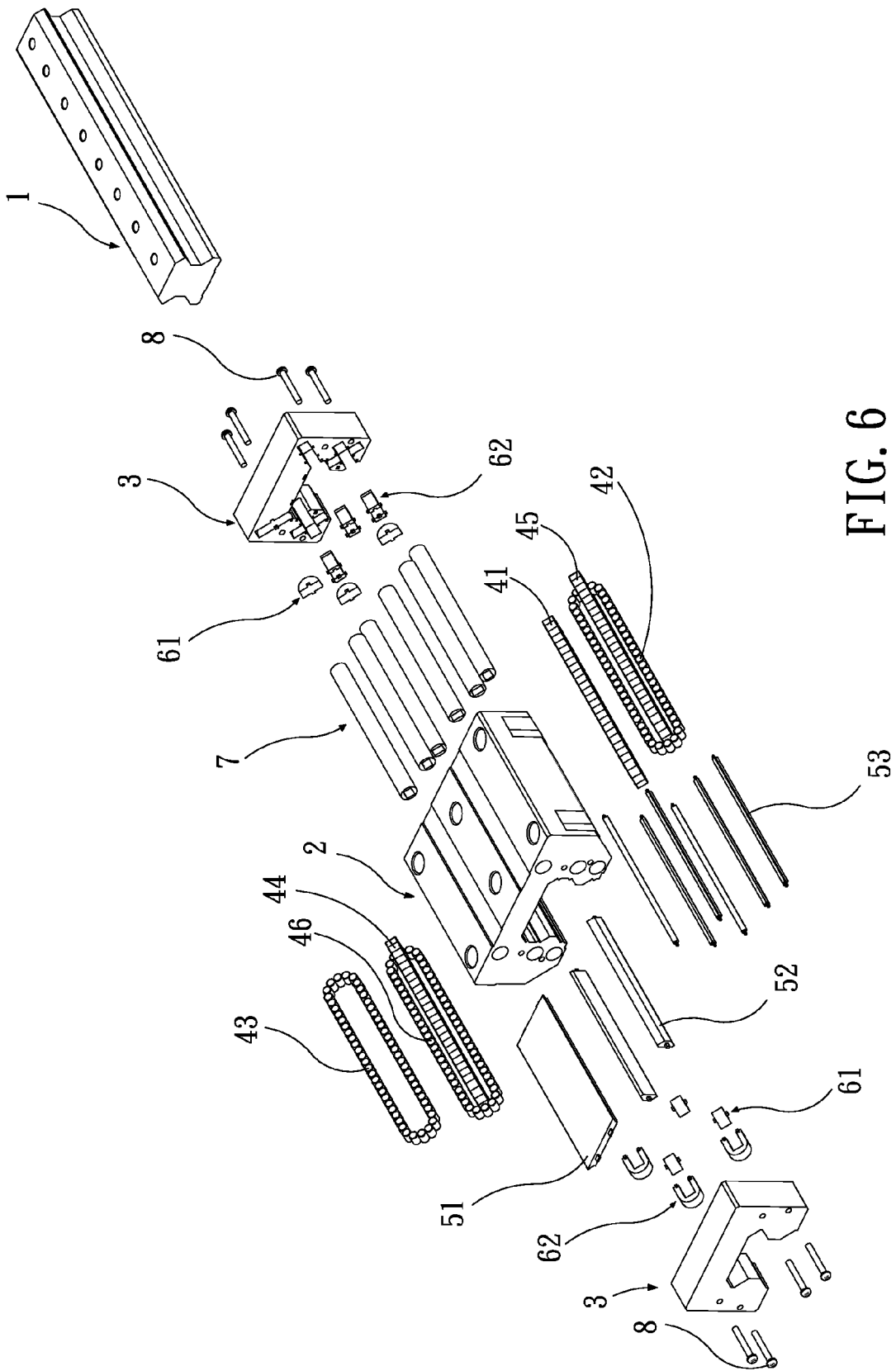
FIG. 6 is an exploded view of showing a linear roller guide unit in accordance with the present invention.

FIG. 6 is an exploded view of showing a linear roller guide unit in accordance with the present invention, the linear roller guide unit comprises a rail 1, a slide block 2, six rows of rollers 4, a plurality of retaining members 51, 52 and 53 for holding the rollers 41, 42, 43, 44, 45, and 46, six inner turning members 61, six outer turning members 62, six circulation pipes 7, two end caps 3, and a plurality of fasteners 8 for fixing the two ends caps 3 to the slide block 2.

Figure 7:
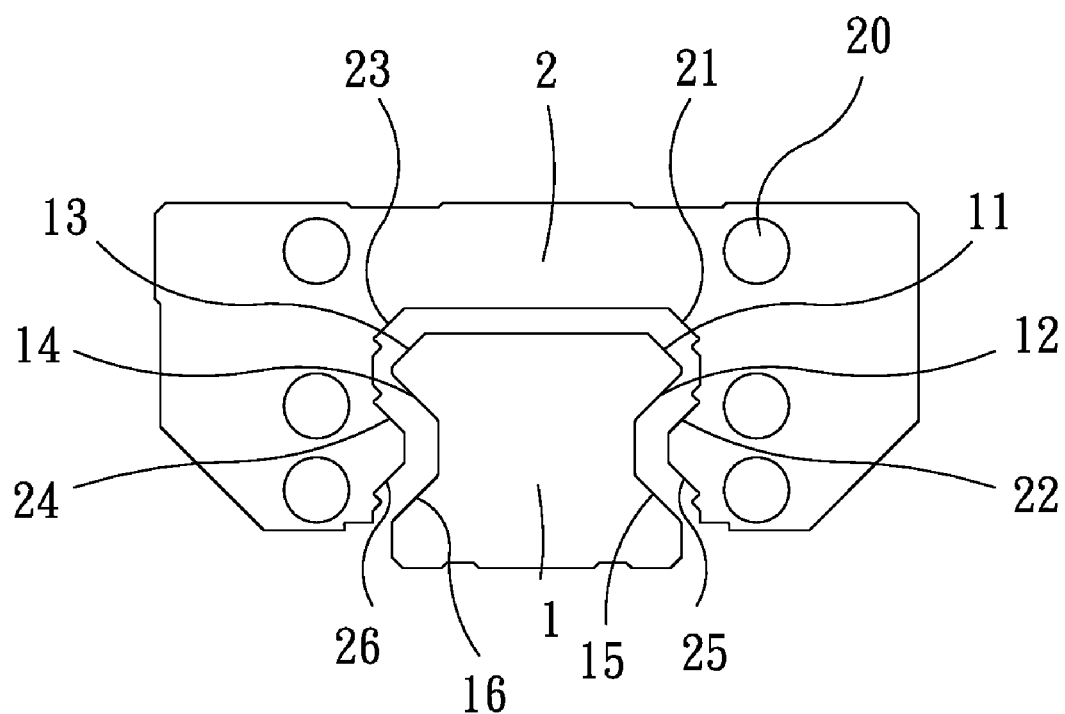
FIG. 7 is a cross sectional assembly view of the slide block and the rail in accordance with the present invention.

FIG. 7 is a cross sectional assembly view of the slide block and the rail, wherein the rail is an elongated structure approximately I-shaped in cross section. A flat rolling surface for rollers is formed at the top right 11, the bottom right 12, the top left 13, the bottom left 14 of the head portion (in cross section) of the rail 1, and at the top right 15 and the top left 16 of the bottom of the rail 1. The slide block has at least six through holes 20 allowing for circulation of the rollers, and six flat rolling surfaces 21, 22, 23, 24, 25 and 26 on which the rollers 41, 42, 43, 44, 45, and 46 roll.

FIG. 8 is a perspective assembly view of showing the liner guide unit in accordance with the present invention, and FIG. 9 is a cross sectional view taken along the line F-F of FIG. 8, the six flat surfaces of the slide block are located correspondingly to the six flat rolling surfaces of the rail 1, the six rows of rollers are arranged in pairs between the flat rolling surfaces. The retaining members 51, 52, and 53 serve to hold the rollers and to prevent the rollers from falling off when the slide block is disengaged from the rail.

Figure 10:
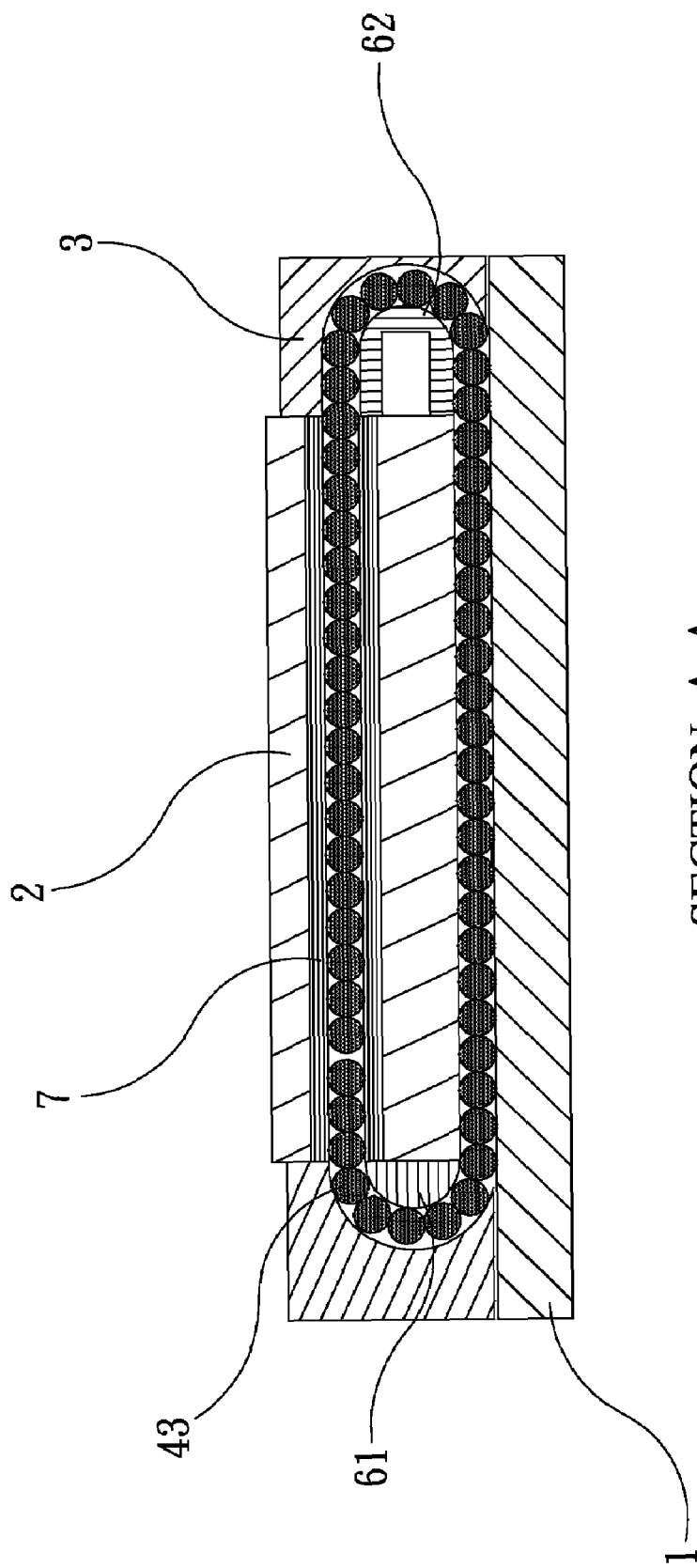
FIG. 10 is a cross sectional view taking along the line A-A of FIG. 9.
Figure 11:
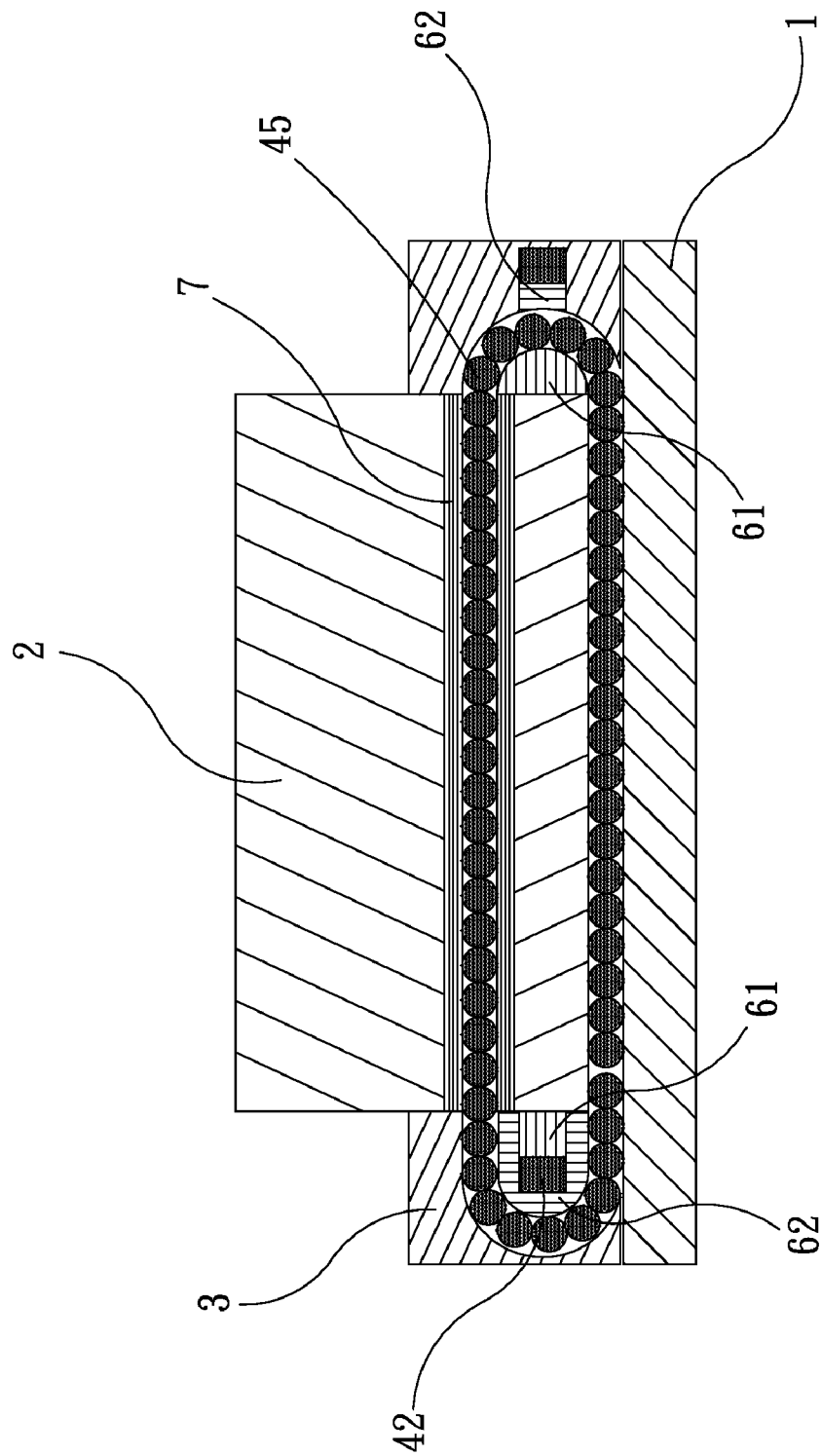
FIG. 11 is a cross sectional view taking along the line B-B of FIG. 9.
Figure 12:
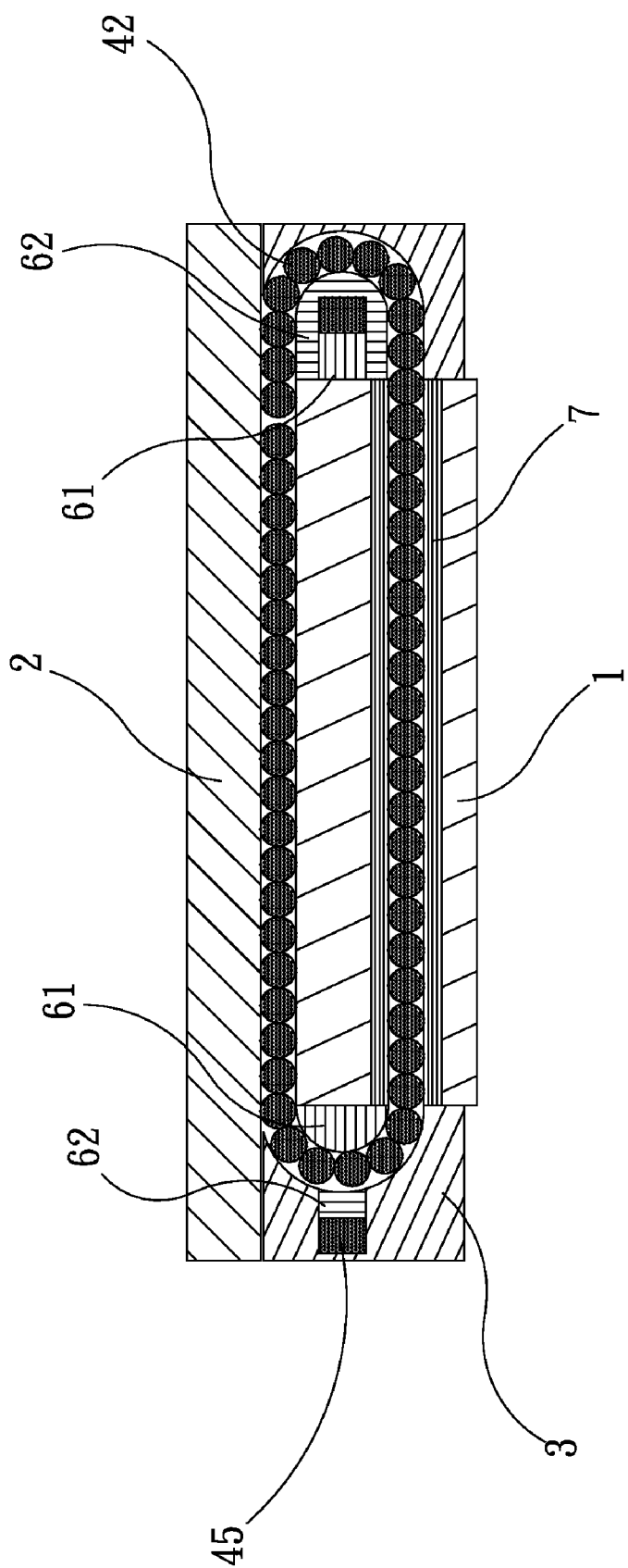
FIG. 12 is a cross sectional view taking along the line C-C of FIG. 9.

FIG. 10 is a cross sectional view taking along the line A-A of FIG. 9, FIG. 11 is a cross sectional view taking along the line B-B of FIG. 9, and FIG. 12 is a cross sectional view taking along the line C-C of FIG. 9. Each of the circulation pipes 7 is a hollow structure inserted in the through holes of the slide block 2 for allowing the rollers to circulate. The end caps 3 are installed at both ends of the slide block 2, and each of the end caps 3 is defined with six arc-shaped surfaces for mating with the turning members.

Figure 13:
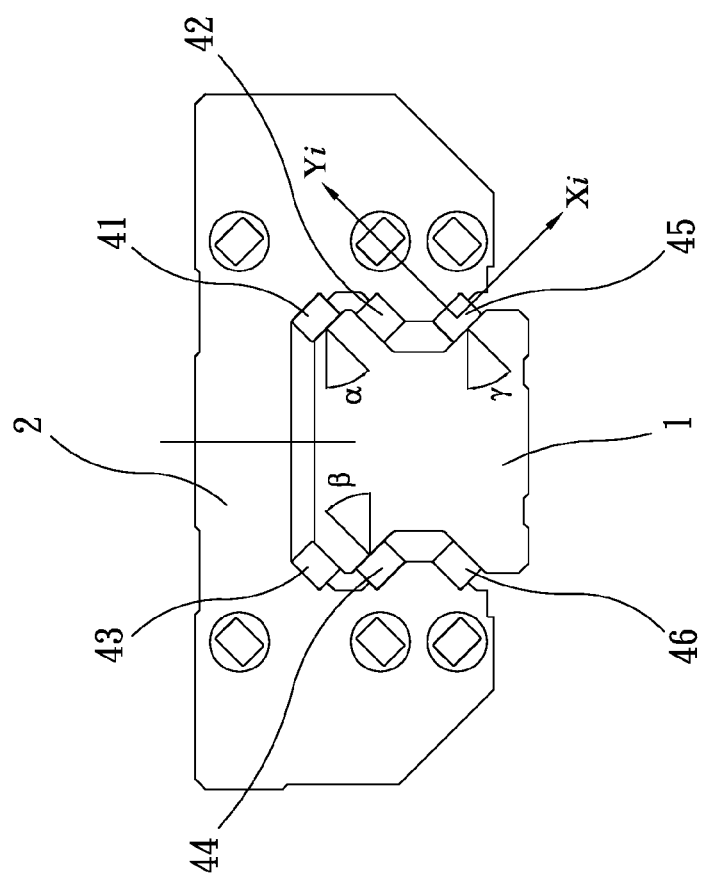
FIG. 13 is an assembly cross section view of showing the slide block and the rail in accordance with the present invention.

FIG. 13 is an assembly cross section view of showing the slide block and the rail, wherein the contact angle of upper rows of the rollers 41, 43 is a, the contact angle of the mid rows of rollers 42, 44 is $\beta$, and the contact angle of the lower rows of the rollers 45, 46 is $\gamma$.

The present invention is developed based on the following theoretical analysis:

1, Analysis on the Mechanism Geometric Relation Simulation and Structural strength:

By using 2D or 3D graphics software to make a mechanism simulation of the primary design of the present invention, it is understood that the linear guide unit of the present invention can be arranged with six rows of rollers if the cross section of the rail of the present invention is the same as that of the prior art. The shoulder portion and the wing portions of the slide block are formed with two circulating holes for allowing the rollers to circulate. In this way, the circulating holes can be dispersedly distributed in the in the cross section, and the resultant structural strength is stronger than the prior art.

2, Mechanical Analysis:

the arrangement of the rollers in the direction of the compressive load is: the contact angle of upper rows of the rollers with respect to the flat rolling surface is a, the contact angle of the mid rows of rollers with respect to the flat rolling surface is $\beta$, and the contact angle of the lower rows of the rollers with respect to the flat rolling surface is $\gamma$. The rollers can roll freely in the radial direction but can't roll in their long axis direction. For ensuring that the rollers can roll smoothly, the circulating direction $Y_i$ of the respective rows of rollers is approximately vertical to the long axis direction $X_i$ of the rollers. Therefore, the mid rows of rollers cross the lower rows of the rollers, and the $\beta$ and $\gamma$ is approximately 45 degrees. The load capacity and impact-resistant performance have to do with the contact angle of the rollers. When the contact angle a of the upper rows of rollers is 90 degrees, the linear guide unit will have an optimum load capacity and impact-resistant performance when it is subjected to a compressive load. When the contact angle a is 45 degrees, the upper rows and lower rows of rollers will share the load equally, thus prolonging the service life of the linear roller guide unit. Therefore, $45° \leq a \leq 90°$.

3, Theory of Fatigue Breakdown

As compared to rollers, the balls are in a point-to-point contact with the surface of the rolling path. When the rail is subjected to a heavy compressive load, the rollers produce a comparatively great contact stress, and this will accelerate the material fatigue of the rollers while reducing the service life of the linear roller guide unit. When a conventional four-row linear roller guide unit is subjected to a heavy compressive load, only two rows of rollers carry the load, the rollers will produce a comparatively large contact stress, and as a result, the material of rollers are more susceptible to fatigue, substantially reducing the service life of the linear guide unit.

Figure 14:
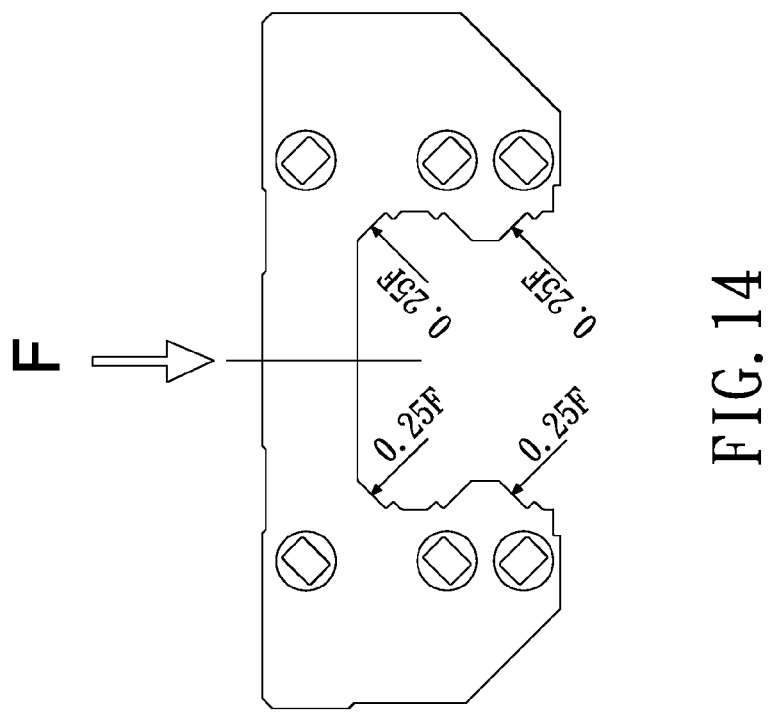
FIG. 14 is an illustrative view of showing a slide block of the conventional six-row linear roller guide unit of FIG. 13.

When the six-row type linear roller guide unit of the present invention is subjected to a heavy compressive load, as shown in FIG. 14, the rollers will produce a comparatively small contact stress, thus it can decelerate the material fatigue of the rollers and prolong the service life of the linear roller guide unit.

Figure 16:
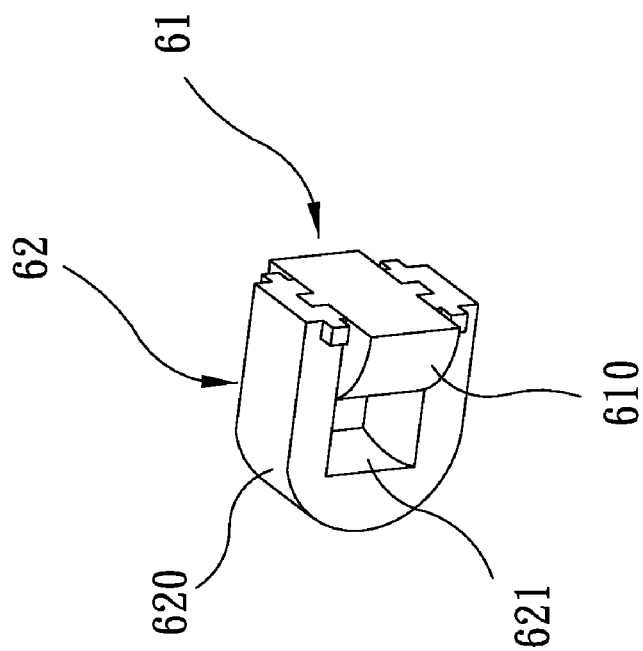
FIG. 16 is an assembly view of showing the inner and outer turning members.
Figure 15:
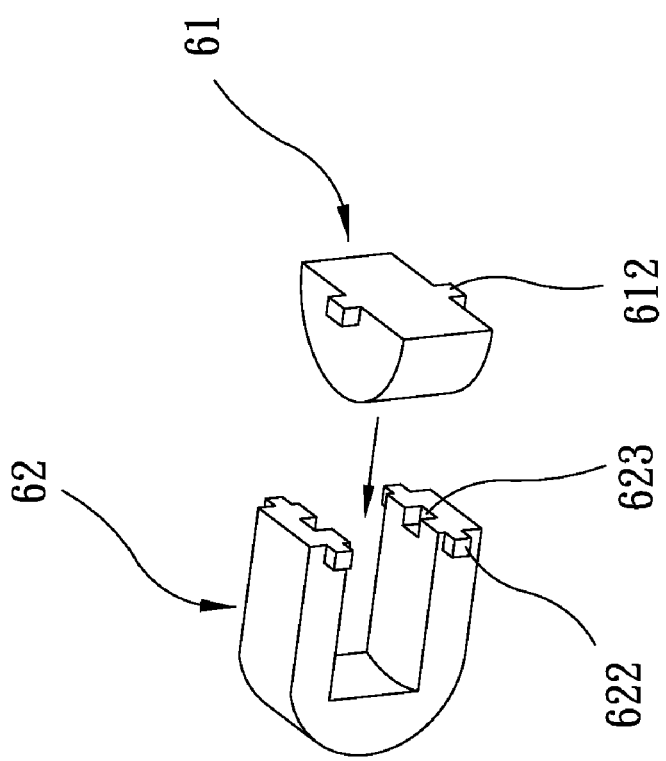
FIG. 15 is an exploded view of showing the inner and outer turning members.

FIG. 15 is an exploded view of showing the inner and outer turning members, and FIG. 16 is an assembly view of showing the inner and outer turning members. The inner turning and outer turning members are set at both ends of the slide block and serve to turn the moving direction of the rollers. An arc-shaped surface 610 is formed on the outer periphery of the inner turning member 61, and two positioning pins 612 are formed at two sides of the respective inner turning members 61 neighboring the arc-shaped surface 610. An arc-shaped surface 620 is formed on the outer periphery of the outer turning member 62, and two positioning holes 623 and two positioning pins 622 are formed in two sides of the respective outer turning members 62 neighboring the arc-shaped surface 610, for mating with the positioning pins 612 of the inner turning members 61 and for mating with the end caps 3, respectively. An arc-shaped surface 621 is formed on the inner side of each of the outer turning members 62 and is located opposite the respective inner turning members 61.

Figure 18:
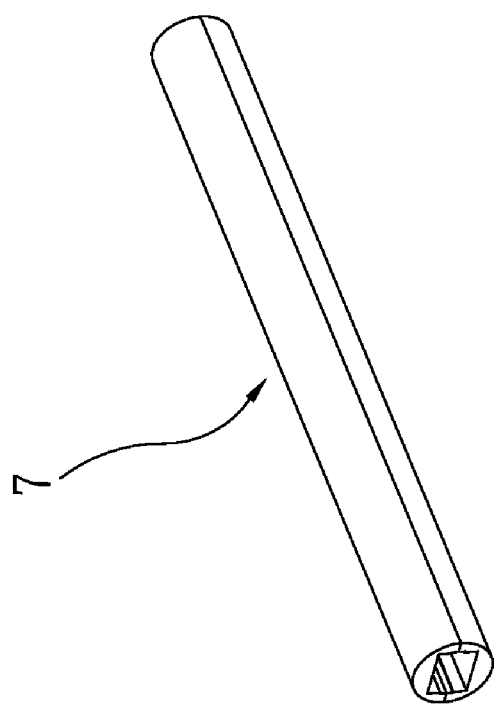
FIG. 18 is an assembly view of the circulation pipe in accordance with the present invention.
Figure 17:
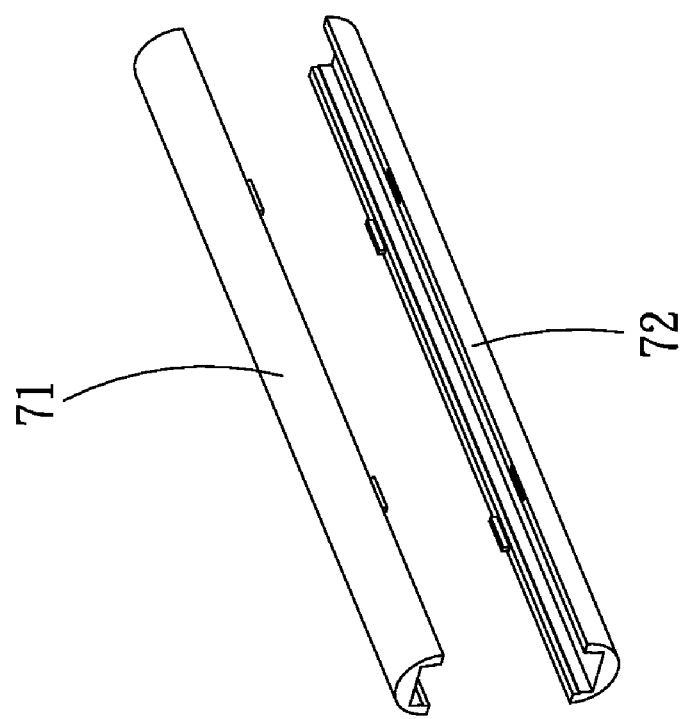
FIG. 17 is an exploded view of the circulation pipe in accordance with the present invention.

FIG. 17 is an exploded view of the circulation pipe in accordance with the present invention, and FIG. 18 is an assembly view of the circulation pipe in accordance with the present invention. Each of the circulation pipes 7 is a hollow structure inserted in the through holes of the slide block 2 for allowing the rollers to circulate. And the circulation pipe 7 is made of two half pipes 71 and 72.

To summarize, the present invention has the following advantages, as compared with the prior art:
1. Substantially increasing the service life of the linear roller guide unit.
2. Substantially improving the structural strength of the slide block and increasing the rigidity of the linear roller guide unit, thus achieve super high precision processing.
3. substantially improving load capacity and impact-resistant performance of the linear roller guide unit.
4. all the parts of the present invention can be made by plastic injection molding, it is suitable for mass production.

While we have shown and described various embodiments in accordance with the present invention, it is clear to those skilled in the art that further embodiments may be made without departing from the scope of the present invention.

What is claimed is:

1. A linear roller guide unit for compressive load comprising:
    a rail, a slide block, six rows of rollers, a plurality of retaining members for holding the rollers, six turning members, six circulation pipes, two end caps, and a plurality of fasteners for fixing the two ends caps to the slide block;
    characterized in that:
    the rail is an elongated structure approximately I-shaped in cross section, a flat rolling surface for rollers is formed at each of a top right, a bottom right, a top left, a bottom left of a head portion of the rail, and at a top right and a top left of a bottom of the rail, the slide block has at least six through holes allowing for circulation of the rollers, and at least six flat rolling surfaces on which the rollers roll, the six flat rolling surfaces of the slide block are located correspondingly to the flat rolling surfaces of the rail;
    the six rows of rollers are arranged in pairs between the flat rolling surfaces, the retaining members serve to hold the rollers and to prevent the rollers from falling off when the slide block is disengaged from the rail;
    the six turning members includes inner members and outer members, each of the inner and outer turning members is defined with an arc-shaped surface, an arc-shaped surface is formed on an inner side of each of the outer turning members and is located opposite the respective inner turning members, the turning members are set at both ends of the slide block and serve to turn the moving direction of the rollers;
    each of the circulation pipes is a hollow structure inserted in the through holes of the slide block for allowing the rollers to circulate; and
    the end caps are installed at both ends of the slide block, and each of the end caps is defined with six arc-shaped surfaces for mating with the turning members;
    the turning members cooperate with the circulation pipes and the two end caps to form a circulation path for allowing the rollers to circulate endless;
    a plurality of positioning pins are formed at two sides of the respective inner turning members neighboring the arc-shaped surface thereof, and a plurality of positioning holes and a plurality of positioning pins are formed in two sides of the respective outer turning members neighboring the arc-shaped surface thereof for mating with the positioning pins of the inner turning members and for mating with the end caps, respectively.

2. The linear roller guide unit for compressive load as claimed in claim 1, wherein each of the circulation pipes is made of two half pipes.

3. The linear roller guide unit for compressive load as claimed in claim 1, wherein a contact angle of upper rows of the rollers with respect to the flat rolling surface is $\alpha$, a contact angle of mid rows of rollers with respect to the flat rolling surface is $\beta$, and a contact angle of lower rows of the rollers with respect to the flat rolling surface is $\gamma$, when the contact angle $\alpha$ of the upper rows of rollers is 90 degrees, the linear guide unit will have an optimum load capacity and impact-resistant performance when it is subjected to a compressive load, when the contact angle $\alpha$ is 45 degrees, the upper rows and lower rows of rollers will share the load equally, thus prolonging the service life of the linear roller guide unit, therefore, $45° \leq \alpha \leq 90$ degrees.

4. The linear roller guide unit for compressive load as claimed in claim 3, wherein the mid rows of rollers cross the lower rows of the rollers, for ensuring that the rollers can roll smoothly, the circulating direction $Y_i$ of the respective rows of rollers is approximately vertical to the long axis direction $X_i$ of the rollers, and the $\beta$ and $\gamma$ is approximately 45 degrees.

* * * * *